Aug. 10, 1937.   L. K. LLEWELLYN ET AL   2,089,385
UNSTACKING AND TRANSFERRING MECHANISM
Filed Aug. 24, 1935   4 Sheets-Sheet 4
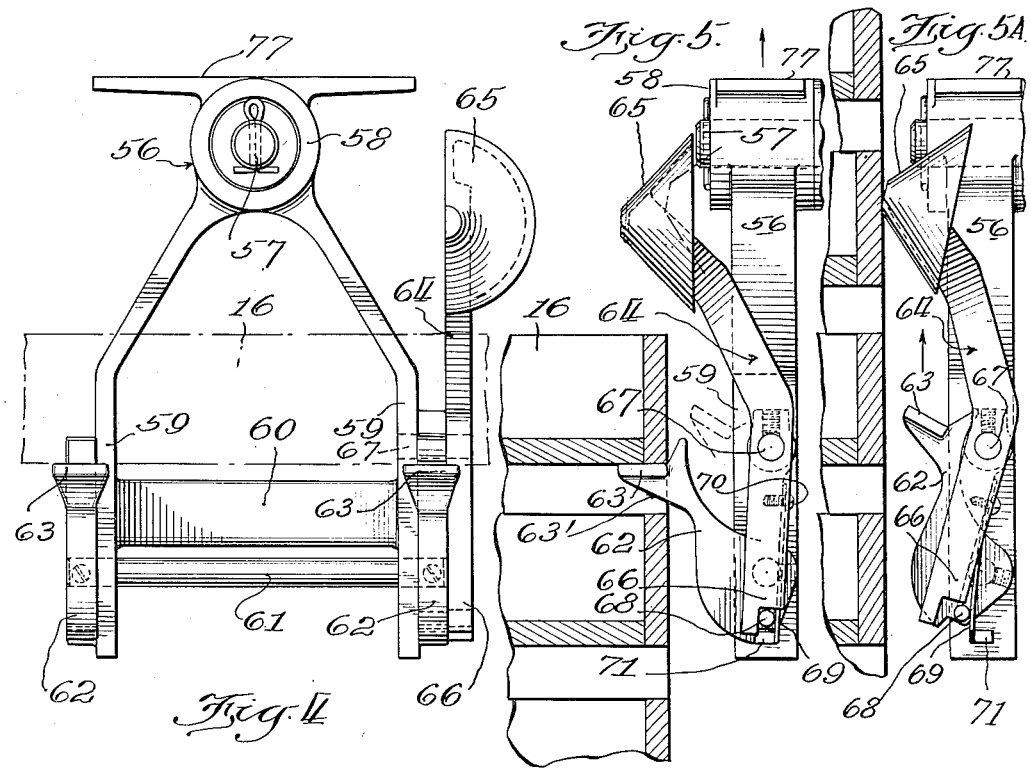
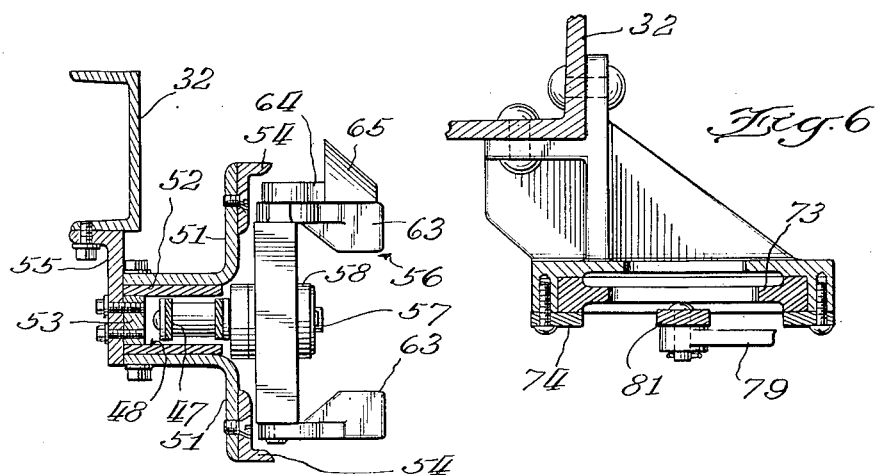
Inventors:
Lewis K Llewellyn
Albert R. Barton Patented Aug. 10, 1937

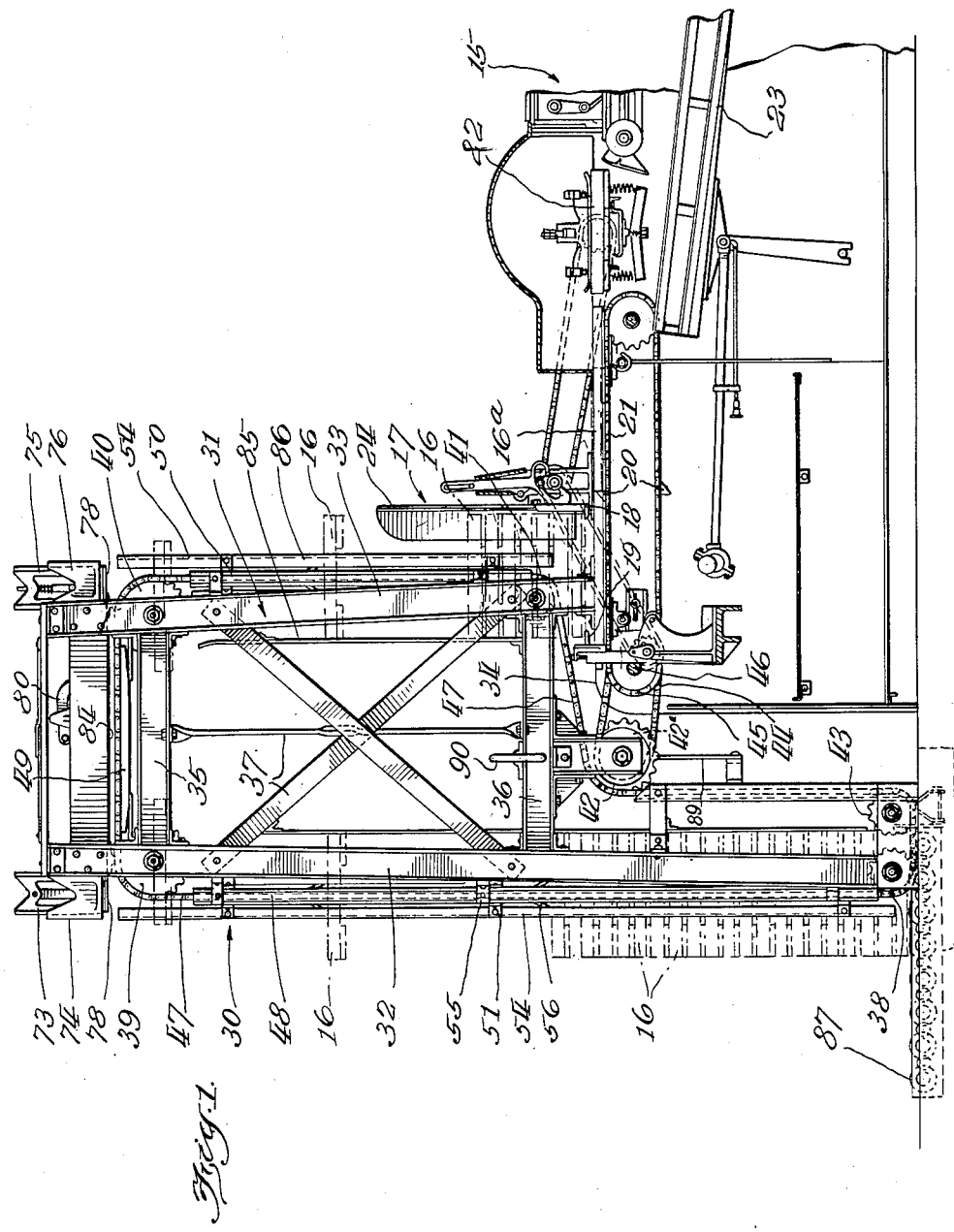
Aug. 10, 1937.  L. K. LLEWELLYN ET AL  2,089,385
UNSTACKING AND TRANSFERRING MECHANISM
Filed Aug. 24, 1935  4 Sheets-Sheet 1
Inventors:
Lewis K Llewellyn
Albert R. Barton
By Williams, Bradbury, McCaleb & Hinkle.
Attys.

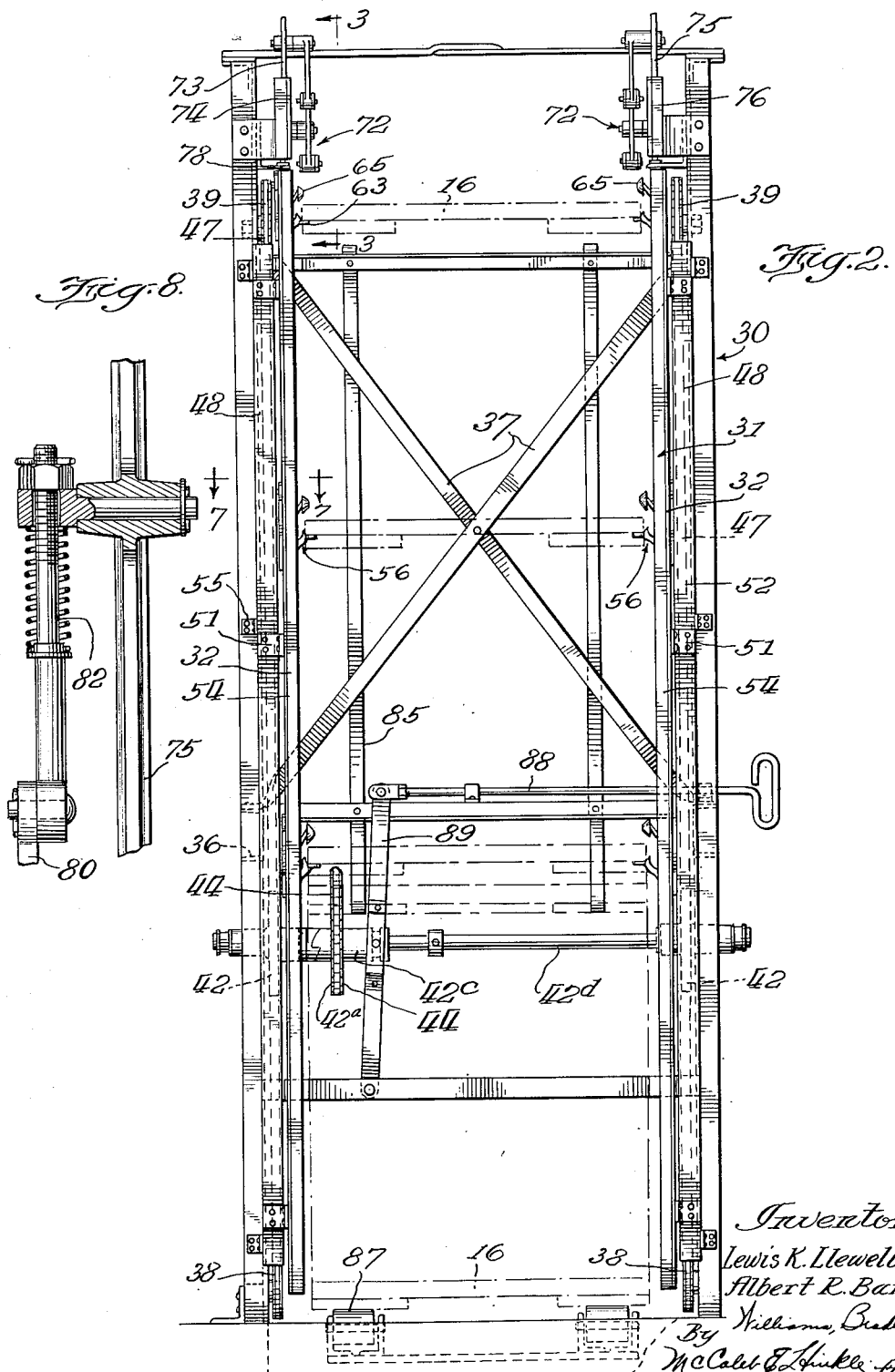

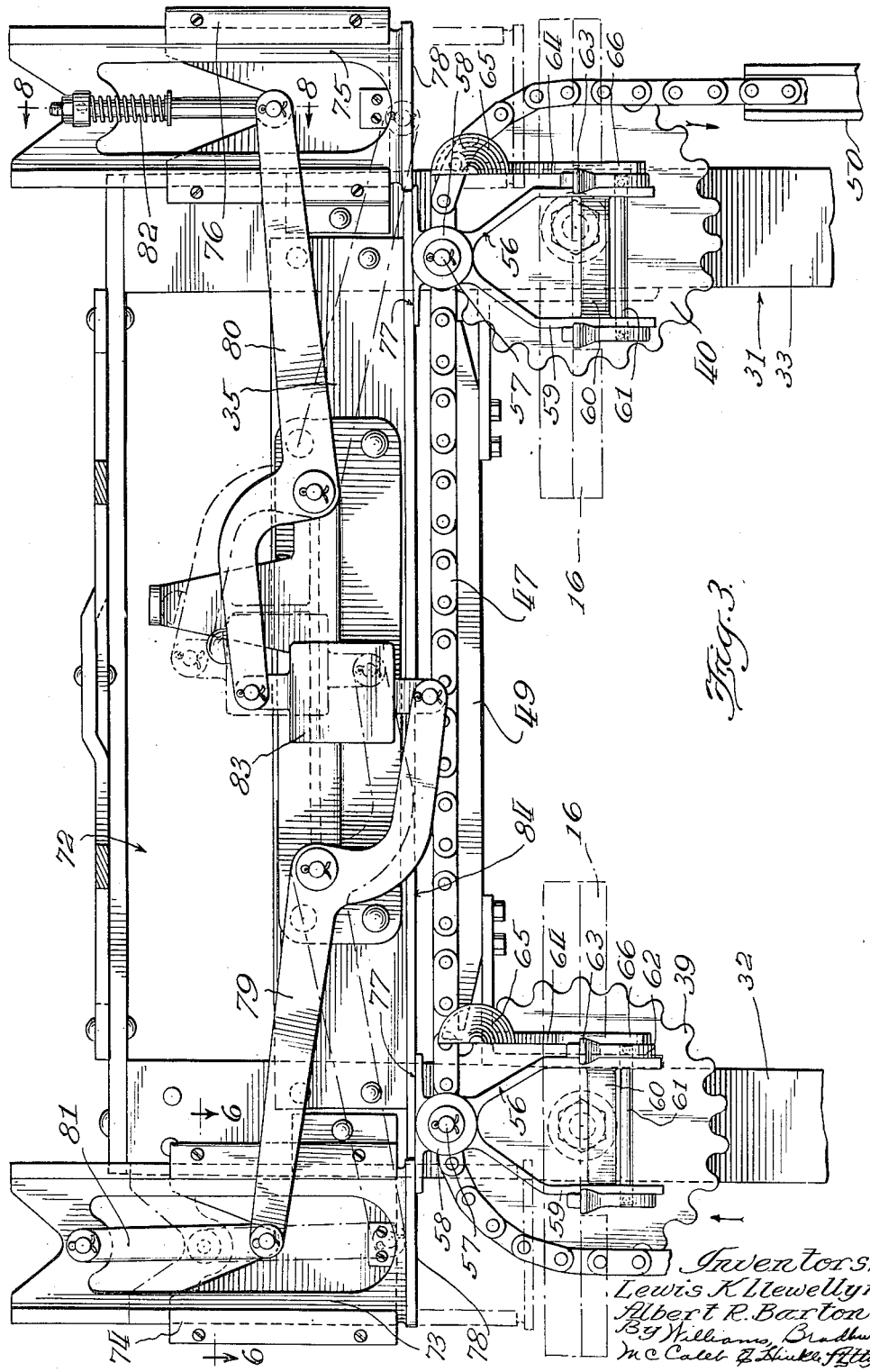

2,089,385

UNITED STATES PATENT OFFICE 2,089,385

UNSTACKING AND TRANSFERRING MECHANISM

Lewis K. Llewellyn, Evanston, and Albert R. Barton, Oak Park, Ill., assignors to E. J. Brach & Sons, Chicago, Ill., a corporation of Illinois Application August 24, 1935, Serial No. 37,662

8 Claims. (Cl. 214—8.5)

Our invention relates to unstacking and transferring mechanism, and especially a mechanism for picking up trays or pallets, individually or in groups of two or more, from a stack and transferring them to a desired receiving mechanism. The specific problem for which our unstacking and transferring mechanism, as here illustrated, is especially intended is that of removing trays one by one, or in groups consisting of two or more trays each, from the top of a stack of trays and delivering them to the top of a short stack in the receiving end of a tray handling mechanism, from which short or working supply stack the mechanism of the receiver continually feeds off the lowermost tray. A high stack of trays cannot feasibly be placed on the receiving stack of such an underfeed mechanism, because the operation of such an underfeed mechanism involves lifting all of the receiving stack, save the lowermost tray, which is fed off into the tray receiving machine. A very high stack on the receiving mechanism at any one time would involve the continual lifting of an impracticably high stack. There would also be the difficulty of simultaneously raising an entire stack of trays to the height of the receiving mechanism and depositing it upon the uppermost trays therein. By the use of our unstacking and transferring mechanism, a stack of such trays is brought to the unstacking mechanism at floor height and the mechanism picks up the trays, one by one, or in groups of two or more, from the top of the stack and carries them up and over the receiving stack on the receiving machine, from the bottom of which the trays are removed, one by one, by the receiving mechanism at about the same rate as that at which the unstacking and transferring mechanism is delivering them.

Our unstacking and transferring mechanism performs a general reversal of the operation of the transferring and stacking mechanism disclosed in Hutchinson Patent No. 1,950,943 of March 13, 1934, and much of the structure of our mechanism is common to that of the Hutchinson patent. However, our unstacking and transferring mechanism is not a mere reversal of the mechanism of the Hutchinson patent, because, for example, we have provided a solution to the problem of successively lifting the uppermost trays of the stack, which would not be accomplished by a mere reversal of the operation of the mechanism of the Hutchinson patent. Also, we have provided for the insertion of a new stack into the unstacking mechanism without necessitating the stopping of the machine.

The foregoing together with further objects, features and advantages of our unstacking and transferring mechanism are set forth in the following description of a specific embodiment thereof and illustrated in the accompanying drawings, in which:

Fig. 1 is a side elevation of our unstacking and transferring mechanism associated with the receiving and feed mechanism of a tray handling machine;

Fig. 2 is a front end view of the unstacking and transferring mechanism;

Fig. 3 is a longitudinal vertical section of the transferring mechanism taken on the line 3—3 of Fig. 2 and looking in the same direction as Fig. 1, to illustrate the stabilizing mechanism of the transferring mechanism;

Fig. 4 is a face elevation of one of the carrier members showing the face thereof, which comes opposite the end of a tray;

Fig. 5 is a side elevation of the carrier member of Fig. 4 showing how it engages the end of a tray;

Fig. 5a is a side elevation of the carrier member showing it in an alternative non-engaging position;

Fig. 6 is a plan section through one end of the stabilizing mechanism taken on the line 6—6 of Fig. 3;

Fig. 7 is a plan section through one of the upright frames and associated chain and carrier guides taken on the line 7—7 of Fig. 2; and Fig. 8 is a vertical transverse section taken on the line 8—8 of Fig. 3 showing a detail of the stabilizing mechanism.

Referring to Fig. 1, 15 illustrates generally a machine well known in the candy manufacturing art which receives trays 16 filled with starch constituting molds for gum drops or other pieces of candy, which has been poured thereinto and allowed to set in a drying room. The machine 15 receives such trays, inverts the trays to dump the starch and candy pieces therefrom, separates the candy from the starch, renovates the starch, again fills the trays with starch, forms mold depressions therein, and fills them with molten candy. The machine 15 itself includes a receiver 17 designed to receive a stack of but a few trays 16 and feed successively the bottommost tray therefrom. This bottom tray feed is accomplished by rear fingers 18 and forward fingers 19, which engage the underside of the tray which is next to the bottom and hold up that tray and the trays thereabove while the bottommost tray 16a is being pushed rearwardly by stops 20 on right and left-hand chains 21, which feed the bottom tray 16a to the inverting mechanism 22, which turns the tray over and dumps the contents onto a jiggling table 23, which separates the starch from the candy. After removal of the bottom tray 16a, the fingers 18 and 19 are caused to descend until the bottom tray, which was previously next to the bottom, rests upon the chain and then the fingers are withdrawn outwardly and elevated and re-inserted under the tray which is then next to the bottom, and then the fingers are slightly elevated to lift the stack off the then bottommost tray so that it in turn may be carried by one of the sets of stops 20 on the chains 21 to the inverting mechanism 22. The receiver 17 includes a vertical guide 24 which embraces the rearward corners of the trays.

It has previously been the practice to deliver high stacks of trays from the drying room to some point on the floor adjacent the receiver 17 of the machine 15, and for an operator to remove the trays, two or three at a time, from the top of the stack and place them in the receiver 17 often enough to keep a small reserve of stacks in the receiver. It is the purpose of our unstacking and transferring mechanism, indicated generally at 30, to receive a high stack of trays and to remove them one at a time or in groups of two or more from the top of the stack, lift each tray or group of trays up and then rearwardly to a position over the receiver, and then deposit each tray or group upon the top of the small stack in the receiver 17.

Our unstacking and transferring mechanism is built upon a frame 31, which comprises forward uprights 32 and rear uprights 33 at the respective corners. The forward uprights 32 extend down to the floor, while the rear uprights 33 extend down to the frame 34 of the machine 15, to which the rear uprights are secured. The frame 31 also includes upper and intermediate horizontal frame members 35 and 36 and cross-ties 37. At each side of the machine and inwardly of the frame, there are pivotally mounted a plurality of chain sprockets constituting a set and comprising a lower front sprocket 38, an upper front sprocket 39, an upper rear sprocket 40, an intermediate rear sprocket 41, an intermediate return and drive sprocket 42, and a lower return sprocket 43. A second sprocket 42a is associated with the sprocket 42 to turn therewith and is driven by a drive chain 44 which passes over it and the sprocket 45 of a power shaft 46 of the machine 15.

An endless conveyor chain 47 passes over and engages the set of sprockets 38, 39, 40, 41, 42 and 43. It will be understood that the conveyor chain 47 and its sprockets are duplicated on each side of the machine and both sets driven by the sprocket 42a and chain 44. Both chains 47 are driven synchronously about their respective sprockets in a clockwise direction, as viewed in Fig. 1.

Each conveyor chain 47 in traveling upwardly from the lower front sprocket 38 to the upper front sprocket 39 passes in a forward chain guideway 48 suitably supported from the frame 31; in passing horizontally from the upper front sprocket 39 to the upper rear sprocket 40, the conveyor chain travels in an upper chain guideway 49; and in passing downwardly from the upper rear sprocket 40 to the intermediate rear sprocket 41, the conveyor chain travels in a rear chain guideway 50. As will be seen from the cross section of one of the forward chain guideways 48, the guideway is formed by a pair of angle strips 51, which frame the guideway, and by wear strips 52 in the channel of the guideway, and a spacing or filler strip 53. These constitute a channel-shaped guideway facing inwardly, within which the conveyor chain 47 travels.

The forward and rear chain guideways 48 and 50 (but not the upper horizontal chain guideway 49) have associated therewith carrier guideways formed by additional angle strips 54, similarly channel-shaped, and opening toward the interior of the mechanism. The guideways are suitably supported from the adjacent members of the frame 31 by brackets 55. At spaced intervals along the conveyor chain 47, the chain supports tray carriers 56. The carriers 56 are pivotally mounted to the chains by substituting extra long chain pivot pins 57 for regular chain pivot pins, the long pivot pins 57 constituting trunnions upon which the carriers 56 are rotatably hung by virtue of the extended end of the pin 57 passing through a boss 58 on each carrier 56.

Referring to Fig. 4, a bifurcated frame depends from the boss 58 as spaced vertical frame members 59, which are reinforced near their bottom ends by an integral cross brace 60. A pivot pin 61 extends between the frame members 59 and is journaled therein and outwardly of each frame member 59. The pivot pin 61 carries fingers 62 non-rotatably mounted on the pin. The upper end of each finger 62, as shown in Fig. 5, carries a tray supporting portion 63.

Outwardly of one of the frame members 59 of each carrier is mounted a feeler lever 64 having a semi-conical feeler head 65 at its upper end and a finger actuating lower end 66. The feeler lever 64 is pivoted to the adjacent frame member 59 by a pivot pin 67 thereon. The adjacent finger 62 carries a pin or lug 68 which is engaged by the lower end 66 of the feeler lever 64. The pin 68 on the finger is resiliently held in contact with the lower end of the feeler lever by a leaf spring 69 secured at its upper end to the feeler lever by screw 70.

The carriers 56 are arranged upon the conveyor chains in horizontally opposed pairs. As a given carrier 56 is traveling upwardly along the forward chain guideway 48 and opposite the stack of trays to be unstacked, as shown in Fig. 1, the associated feeler head 65 is caused by gravity, as shown in Fig. 5a, to swing against the ends of the trays in the stack and ride upwardly along their ends. The feeler lever 64 operating through its leaf spring 69 presses clockwise against the pivot pin 68 on the associated finger 62, whereby the associated finger 62 and, through the pin 61, the opposite finger 62 are swung upwardly so that their tray supporting portion 63 are out of contact with the trays. As soon as the feeler head 65 has reached the top of the stack of trays, it will move inwardly over the upper edge of the top tray, as shown in Fig. 5, with the fingers 62 against a stop 71 on the adjacent carrier frame member 59, and this will swing the lower end of the feeler lever 64 to the right and through the pin 68 swing the fingers 62 downwardly so that their tray supporting portions 63 enter the space between the top tray or the bottom member of the group to be lifted and the next tray below, which intertray space may be formed by lateral strips along the bottom of each tray. In the illustrated embodiment the distance between the head 65 and the portions 63 is such that only one tray is picked up at a time.

Continued upward movement of the carriers 56 with the tray supporting portions 63 of the fingers 62 beneath the ends of the top tray lifts the top tray from the stack and carries it upwardly until the pivots 57 of the carriers pass with the chain around the upper front sprockets 39. During this upward travel the center of gravity of the carriers 56 and the tray is well below the axis of the carrier pivots 57, so that the tray being lifted tends by gravity to assume a horizontal position. This is further aided by the angle strips 54 (Fig. 7) which guide the carriers and prevent their rocking through a substantial arc.

For holding the carriers 56 against rocking while their pivots pass around the sprocket 39 and along the upper chain guide 49 and around the upper rear sprocket 40, we provide a stabilizing mechanism like that shown in the previously mentioned Hutchinson patent. Reference is made to the specification of the Hutchinson patent for a fuller description of the stabilizing mechanism, and we shall here give only an abbreviated description of the stabilizing mechanism indicated generally at 72 and illustrated in Fig. 3.

At each side of the machine and above the level of the upper chain guideway 49, we provide a pair of reciprocably mounted shoes,—a forward shoe 73 reciprocating in a vertical guideway 74, and a rear shoe 75 reciprocating in a vertical guideway 76. Each carrier includes, above its trunnion pivot 57, a horizontal table portion 77, which constitutes the top edge of the carrier. This table portion is adapted to engage flatwise the contacting bottom surfaces 78 of the shoes 73 and 75. As the carrier 56 rises at the forward reach of the conveyor chain and reaches the upper front sprocket 39, its table portion 77 engages the contacting surface 78 of the shoe 73, which at that time is in the dotted line position of Fig. 3. Continued upward arcuate movement of the carrier 56 raises the shoe 73 and also slides the table portion 77 toward the right from its original alignment with the shoe surface 78. This upward movement of the shoe 73 is applied to the simultaneous upward movement of the rear shoe 75 to bring the lower contacting surface 78 of the latter to the elevation necessary for receiving the anterior carrier 56 shown at the right of Fig. 3. Interconnection of the shoes 73 and 75 is effected by a forward shoe actuated lever 79 and a rear shoe actuating lever 80, both pivoted on the frame. The forward end of the lever 79 is connected with the shoe 73 by a link 81, while the rear end of the lever 80 is connected to the shoe 75 by a resilient link 82 in the form of a rod and spring. The adjacent ends of the levers 79 and 80 are interconnected by a counterweight link 83, which performs the dual function of causing the levers to swing together and partially offsetting the weight of the shoes themselves, tending to move them to their lower positions. When the carrier moving around the sprocket 39 reaches its uppermost position, its table portion 77 slides out of contact with the lower contacting surface 78 of the shoe, which has been holding the carrier against rocking movement, and the carrier table portion comes into sliding contact with the undersurface of a horizontal shoe guide plate 84 which extends between the shoes 73 and 75 and holds the carriers against rocking while they are passing in the upper horizontal reach between the sprockets 39 and 40. In a somewhat similar manner, the shoe 75 is allowed to descend after the table portion 77 of the carrier has moved under the contacting surface 78 of the rear shoe 75, and the rear shoe 75 then follows the carrier 56 during its rearward and downward movement around the sprocket 40 and holds it against rocking movement until it has safely entered the carrier guideway associated with the adjacent rear chain guideway 50. As the opposed pair of carriers descend along the rear chain guideway 50 the tray they are carrying is guided into alignment with the receiving stack by a forward positioning strip 85 and end positioning strips 86, which cooperate with the previously mentioned rear positioning guide 24 to maintain the receiving stack in alignment. When the down traveling tray reaches the top of the stack and itself becomes the top tray of the receiving stack, the underlying trays take the support of the tray away from the fingers 62 of the associated carriers, and the cam surfaces 63', which underlie the tray supporting portion 63 of the fingers 62, engage the underlying tray and swing the fingers outwardly so that the portions 63 are withdrawn beyond the ends of the trays. As the carriers continue to descend down to the sprockets 41 at the lower end of the rear chain guides 50, the heads 65 ratchet past the ends of the underlying trays of the receiving stack.

In order to avoid interference with the receiving mechanism 17 of the machine 15, we do not continue the chain guideways 50 down to the floor, but bring the conveyor chain 47 and its associated carriers forwardly and then downwardly over the sprocket 42, thus clearing the forward end of the machine 15.

Preferably the unstacking and transferring mechanism is set to run at a speed which delivers trays a little faster than the machine 15 is removing them from the stack on the receiver 17. When the stack being unstacked is exhausted, the unstacking mechanism is stopped and a new stack is inserted, preferably by resting it on the floor rollers 87 and pushing it into position in the unstacking machine. The previously mentioned faster delivery speed of the unstacking and transferring mechanism in relation to the machine 15 is utilized to accumulate a few trays in the receiving stack in the receiver 17, which may be discharged by the machine 15 while the unstacking and transferring mechanism is shut down for the placement of a new stack.

A starting and stopping clutch for the unstacking and transferring mechanism may be provided by mounting the drive sprocket 42a upon a clutch sleeve 42c which really rotates on the shaft 42d for the sprockets 42. The clutch sleeve 42c, as shown in Fig. 2 is moved into and out of engagement with the shaft carrying clutch member by a clutch lever 89, which may in turn be operated by a handled clutch rod 88.

Referring again to the action of the carrier fingers 62 and the feeler lever 64, the conical feeler head 65 presents essentially a lower cam surface, an upper cam surface and a lateral cam surface. When a carrier is moving downwardly and deposits its tray upon the receiving stack, the contact of the cam surfaces 63' of the fingers 62, as previously described, throws the fingers outwardly from beneath the tray they have been carrying. Soon after, the lower cam face of the head 65 strikes the upper edge of the end of the tray which has just been deposited and the cam surface causes the head to be swung to the right from the position of Fig. 5 to the position of Fig. 5a and this, acting through the pin 68, throws the fingers 62 further outwardly until the overhanging edges of their portions 63 abut the frame members 59 of the carrier. Any outward movement of the head 65 in riding along the ends of the trays in the receiving stack, beyond the movement of the lever 64 required to swing the fingers 62 into engagement with the frame 59, will be absorbed by the leaf spring 69. Thus the feeler head 65, which by virtue of the truncation of its semi-conical surface has a broader end surface for engagement with the ends of the trays, performs the function of holding the fingers 62 out of engagement with the ends of the trays, so that they do not continuously ratchet along the ends of the trays and continually fall into the inter-tray spaces.

When the carrier 56 is traveling upwardly to the top of the stack being unstacked, the feeler head 65 similarly holds the fingers 62 out of engagement with the trays, and the upper cam surface of the head 65 serves to swing the head further outward to pass by any tray which may be offset laterally outwardly beyond the line of the stack.

When a new stack is trundled along the rollers 87 to unstacking position in the mechanism, the lateral cam face of the head 65 comes into play by engaging the adjacent forward corner of the stack of trays and swinging the lever 64 outwardly to move the fingers 62 outwardly to the position of Fig. 5a, where they will not interfere with the rearward movement of the new stack into unstacking position.

The action of the feeler lever and the fingers 62 in lifting the top tray from the stack being unstacked, is as follows:

Until the topmost tray is passed, the nose of the feeler head 65 slides along the adjacent ends of the trays, ratcheting somewhat as the inter-tray spaces are passed. As soon as the feeler head 65 passes the upper edge of the end of the top tray of the stack, gravity causes the feeler head to swing inwardly over the top of the end of the tray, rotating the feeler lever 64 counter-clockwise from the position of Fig. 5a to the position of Fig. 5. This throws the fingers 62 outwardly, but their tray engaging portions 63 will at that moment engage the end of the next to the top tray, holding the feeler lever 64 from moving fully to its position of Fig. 5. The ends of the fingers 62 thus ride upwardly along the end of the next to the top tray until the space between it and the top tray is reached, at which time the tray supporting portion 63 of the fingers will enter the space between the trays and the parts will then fully assume the position of Fig. 5. Continued upward movement of the carrier will cause the fingers to lift the top tray.

While we have described this specific embodiment of our invention, we contemplate that many modifications and changes may be made therein without departing from the scope or spirit of our invention.

We claim:

1. A carrier for an unstacking mechanism for trays comprising trunnion mounting means for the carrier, a frame depending vertically therefrom, a finger shaft extending through the frame at its lower end in a horizontal direction at right angles to the trunnion mounting, a pair of fingers mounted on the shaft for liftingly engaging the end portions of trays of a stack of trays to be unstacked, a feeler lever pivotally mounted on the carrier above the finger shaft and having at its upper end a feeler head adapted to ride along the ends of the trays of the stack and fall inwardly above the topmost tray of the stack, means on the lower end of the feeler lever for rotating the fingers outwardly when the head moves outwardly and inwardly to tray engaging position when the head moves inwardly, said means including a resilient member yielding to permit further outward movement of the feeler head after the fingers have reached their maximum outward movement.

2. A carrier for an unstacking mechanism for trays, comprising tray supporting means movable along a stack of trays and movable to and from a tray supporting position between succeeding trays in the stack, and a tray controlled feeler movable with the tray supporting means along said stack and pivoted intermediate its ends and including movable means engageable with said tray supporting means for operating the same and cam means above the pivot for operating said movable means to operate said tray supporting means, said cam means having a tray engageable cam surface for causing said tray supporting means to move out of tray supporting position as said tray supporting means approaches said stack of trays, a tray engageable cam surface for maintaining said tray supporting means out of tray supporting position until said tray supporting means reaches a predetermined position along said stack of trays, and a tray engageable cam surface for causing said tray supporting means to move into tray supporting position when said tray supporting means reaches a predetermined position along said stack of trays.

3. A container supply apparatus for supplying containers to a container handling machine, comprising means for serially removing containers from the top of a supply stack of containers, receiving means for receiving containers, means for transferring the containers removed by the first said means to said receiving means, means for stacking the transferred containers in said receiving means, and means for serially releasing containers from the superposed containers and removing the same from the bottom of the stack in said receiving means less rapidly than they are transferred thereto.

4. A container supply apparatus for supplying containers to a container handling machine, comprising means for consecutively releasing and feeding containers one at a time from a receiving stack to a container handling machine, means for removing containers one at a time from a supply stack, and means for transferring the containers removed from said supply stack to said receiving stack more rapidly than the feeding means feeds them from said receiving stack for building up a reserve supply of containers in the receiving stack for supplying said feeding means during replenishment of containers to the removing means.

5. In a confection making machine, the combination with tray handling apparatus for successively handling trays for carrying the confection, of receiving means for receiving the trays, means for removing the trays from a supply stack of trays and for transferring and removing trays to the receiving means, means associated with the receiving means for releasing trays therefrom, and tray removing means cooperating with the releasing means for removing the released trays from said receiver and for successively feeding them to said tray handling apparatus.

6. In a confection making machine including a continuously operable tray handling apparatus for handling trays one at a time, an apparatus for supplying trays from a supply stack of trays to said continuously operable tray handling apparatus, comprising a tray receiver, means for removing trays from the supply stack and for transferring the removed trays to the receiver, means associated with said receiver for releasing trays therefrom, and tray removing means cooperating with the releasing means for removing the released trays from said receiver and for supplying the trays removed from said receiver for handling one at a time by said continuously operable tray handling apparatus.

7. In combination in a tray supply apparatus for supplying trays to a tray handling machine, means for unstacking a stack of trays from the top of the stack, means for stacking such trays in a receiving stack, means for removing trays from the bottom of said receiving stack, and means for driving the unstacking, delivering, and removing means at a speed whereby a reserve supply of trays is provided for supplying the removing means during replenishment of trays in the unstacking means.

8. A container supply apparatus for supplying containers to a container handling machine, comprising means for unstacking, transferring, and restacking containers, receiver means in which the containers are restacked, means for removing said containers from said receiver means and supplying them one at a time to said container handling machine, and means for driving the foregoing means at a rate whereby a reserve supply of containers is provided in said receiver means.

LEWIS K. LLEWELLYN.
ALBERT R. BARTON.